(12) United States Patent
Ruemekorf et al.

(10) Patent No.: US 7,179,435 B2
(45) Date of Patent: Feb. 20, 2007

(54) METHOD AND APPARATUS FOR RECOVERING A PURE SUBSTANCE FROM AN IMPURE SOLUTION BY CRYSTALLIZATION

(75) Inventors: Ray Sircy Ruemekorf, Rosmalen (NL); Reinhard Uwe Scholz, Kerken (DE)

(73) Assignee: Niro Process Technology B.V., S-Hertogenbosch (NL)

( * ) Notice: Subject to any disclaimer, the term of this patent is extended or adjusted under 35 U.S.C. 154(b) by 156 days.

(21) Appl. No.: 10/658,459

(22) Filed: Sep. 10, 2003

(65) Prior Publication Data

US 2005/0074378 A1    Apr. 7, 2005

(30) Foreign Application Priority Data

Sep. 10, 2002    (EP)    ................... 02078711

(51) Int. Cl.
*C30B 35/00*    (2006.01)
(52) U.S. Cl. .................. 422/245.1; 422/251; 422/252; 422/255
(58) Field of Classification Search ............. 422/245.1, 422/251, 252, 255
See application file for complete search history.

(56) References Cited

U.S. PATENT DOCUMENTS

| | | | |
|---|---|---|---|
| 3,981,196 A | * | 9/1976 | Zeuch et al. ................. 374/101 |
| 3,992,900 A | | 11/1976 | Campbell |
| 4,091,635 A | | 5/1978 | Ogman |
| 4,787,985 A | | 11/1988 | Roodenrijs et al. |
| 5,062,862 A | | 11/1991 | Jansen |
| 5,961,935 A | * | 10/1999 | Lee et al. ................. 422/245.1 |
| 6,565,653 B2 | * | 5/2003 | Wilsak ........................ 117/68 |
| 6,719,954 B2 | * | 4/2004 | Jansen ..................... 422/245.1 |

FOREIGN PATENT DOCUMENTS

GB    1 453 645    10/1976

\* cited by examiner

*Primary Examiner*—Robert Kunemund
(74) *Attorney, Agent, or Firm*—Young & Thompson

(57) ABSTRACT

The invention relates to an apparatus for the purification of a substance from a solution, a suspension or a mixture of liquids by crystallization, preferably in a continuous manner. The apparatus comprises a first crystallizer (1c) comprising an input (1) for receiving a liquid comprising the substance and an output (4) for discharging a slurry of liquid and crystals. The apparatus comprises also a first separator (1s) connected to the output 4 of the first crystallizer (1c) having a product output (2), and being with a residue output (5) connected to an input of a second crystallizer (2c), and a second separator (2s) being with an input connected to an output (6) of the second crystallizer (2c), a crystal output (7) of the second separator (2s) being connected to an input of the first crystallizer (1c).

11 Claims, 3 Drawing Sheets

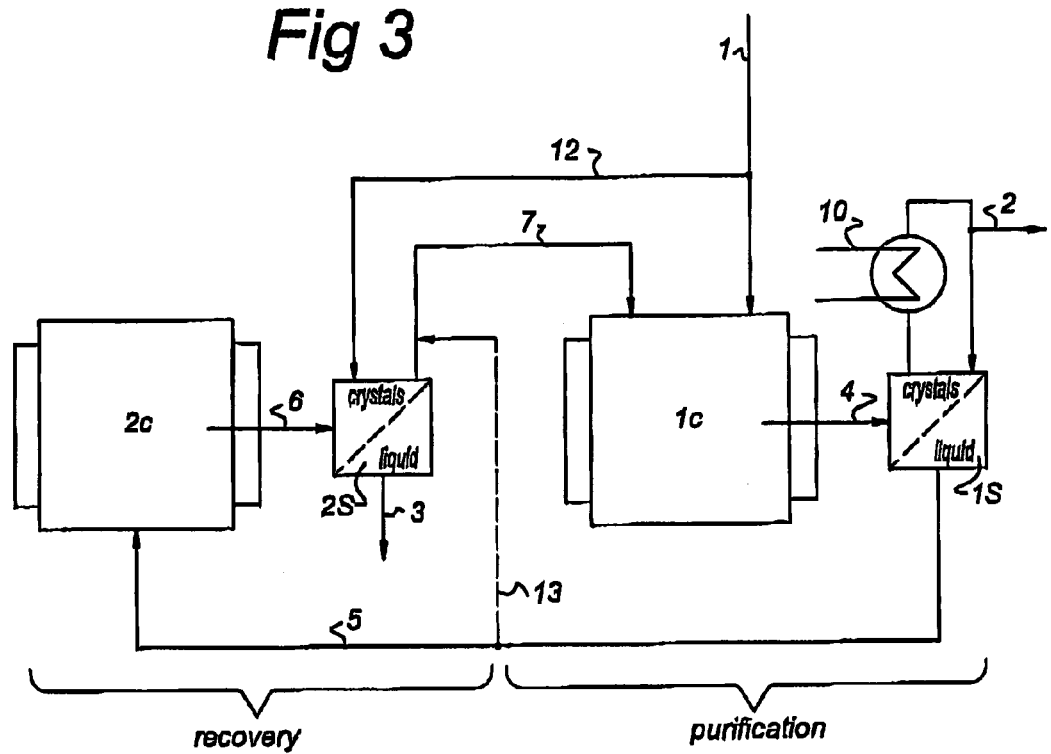

METHOD AND APPARATUS FOR RECOVERING A PURE SUBSTANCE FROM AN IMPURE SOLUTION BY CRYSTALLIZATION

BACKGROUND OF THE INVENTION

The invention relates to a two step crystallization process for recovery of a purified solvent from a liquid mixture and to an apparatus for carrying out the method. The invention in particular relates to a process where a) this starting mixture is subjected to a crystallization step where the solvent forms a suspension of solvent crystals and liquid residue and b) where these crystals are separated in wash columns to form pure solvent product and liquid residue that is passed to c) the second step where more solvent crystals are formed and d) these crystals are partially separated to form a solvent enriched product that is combined with the starting mixture in step a) and a liquid residue that is discharged from the process The crystallization process can produce pure product crystals. Eutectic systems offer the possibility to produce pure product from mixtures with a wide range of impurities. The phase diagram, such as shown in FIG. 1, illustrates this for a typical chemical eutectic solution. Product B can be produced as pure crystal plus a liquid residue containing B plus impurities all the way down to the eutectic concentration ($x_e$ as wt % of B in liquid residue). The maximum recovery possible using only crystallization for a particular product is determined by the eutectic concentration $x_e$. The equilibrium temperature ($T_e$) of the solution at eutectic concentration is dependent on the physical properties of the specific product. It is important to note that this concentration is generally not attainable using a single step system. The limitations of the wash column in this aspect are further explained in U.S. Pat. No. 5,062,862. The production of an ultra-pure product by this crystallization technology requires the complete separation of the pure product crystal from the impurities remaining in the liquid residue.

The large crystal surface area that allows the optimum growth conditions for the production of pure crystals will negatively affect most attempts at separation. The impurities in the remaining liquid will adhere to all surfaces and complete removal of these impurities is necessary to finish the purification. Wash columns are perfectly suited to complete this task. The advantages of wash column use in similar applications are explained in detail in U.S. Pat. No. 5,062,862. Wash columns do, however, have certain restrictions with respect to their range of operation. When the requirement for ultra pure product is coupled with the requisite for high recovery rates, single stage crystallization would lead to an excessive concentration and temperature jump over the wash column. This is a major limitation of such a separation unit as also indicated in U.S. Pat. No. 5,062,862.

One solution to this problem was presented in the application of multiple stage crystallization as described in U.S. Pat. No. 4,787,985. For applications with a low reject concentration (low eutectic point and high recovery requirements) the installation of up to 5 stages is necessary in order to supply the wash column with a good conditioned feed. Technically the multistage crystallization is an attractive solution as it provides crystal growth at the best possible conditions. Also energy-wise it can offer advantages for systems with a low eutectic temperature, since only the last stage has to be operated at the low temperatures typically found at the eutectic whereas the purification stage feeding the wash column would operate at higher temperatures. The major disadvantage of this process is it's high investment cost.

Another idea to overcome the problem of a limited operating window for a packed bed wash column is described in the invention according to U.S. Pat. No. 5,062,862. Here the low temperature crystal slurry, after an initial partial separation of the crystals in a first wash column, is then reslurried in molten product and this suspension is then separated in a second wash column. The above stated limitations based on temperature jump over the first wash column is of no concern in this configuration since it is not attempted to provide a complete separation of crystals from the liquid residue in this first wash column; a certain carryover of liquid impurities after the first wash column is accepted because the final purification is performed in a subsequent second wash column.

A disadvantage of this reslurry process is the fact that all crystals are formed at the lowest temperatures and thus low concentrations of the main component as dictated by the recovery requirements. The crystal growth rate strongly decreases and the nucleation rate strongly increases when the concentration of the main component is reduced. Both effects result in the production of small crystals. To produce crystals of at least 100–200 μm, which are suitable for subsequent separation in wash columns, large residence times are necessary. This results in the requirement of large crystallizers with the corresponding high investment cost. For some applications it is not possible at all to grow crystals to the required size at those low temperatures. Small crystals would also lead to a more difficult solid-liquid separation—even if the required purities can still be achieved, the throughput of a wash column will decrease.

The object of the invention is to provide a process for the production of a crystal suspension under certain boundary conditions which process does not have the disadvantages above, or at least in a substantially reduced rate.

The present invention relates to a two-step crystallization purification process for the recovery of a high purity end product. As indicated earlier the present crystallization processes are disadvantaged by the high capital cost and relatively complicated equipment. The invention reduces the number and complexity of the required components and therefore reduces the investment costs. It has now been discovered that various chemical mixtures do not require the installation of multiple stages within each section. The type of crystallizer can also be simplified and the recrystallization vessel is omitted. These finding can significantly reduce the investment and operation costs when compared to the process described in U.S. Pat. No. 4,787,985.

SUMMARY OF THE INVENTION

The invention therefore is characterized by a process and processing unit configuration containing two steps with similar apparatus for crystallization and separation in each step. The first step, or purification step, comprises feeding a relatively pure liquid mixture to a scraped surface vessel type crystallizer consisting of a jacketed drum for heat removal and rotating scraper assembly to clear the product crystals from the drum surface that is cooled by circulating refrigerant liquid in the outer jacket. This type of crystallizer is known in industry and its specifics are not part of the invention. Cooling the feed liquid will cause a portion of the product to form pure product crystals with the remaining part consisting of the liquid residue. The operating temperature of this first step can be chosen such that a final product of the required purity is achieved in the separation section. This separation is advantageously carried out in a wash column. The separation removes the crystals formed in the crystallizer from the liquid residue. All remaining liquid residue should be removed from the crystal mass and the crystal mass is then melted and discharged as liquid product. The remaining liquid residue still contains valuable product. This liquid residue is then fed to a second step, or recovery step that is preferably smaller but comprises an essentially equal configuration as the first step. The recovery step crystallizer again cools the liquid residue so that product crystals are formed. The slurry consisting of pure product crystals and liquid residue is then advantageously separated in a wash column. The operating temperature of the recovery step can be significantly lower than that found in the purification step. The limitation based on the temperature difference over a wash column as indicated in U.S. Pat. No. 5,062,862 is of no concern in this application since it is not desired to provide a complete separation of crystals and liquid residue in this separation section of the recovery step. The reason is based in that it was found that even a partial separation of the crystals is sufficient to remove a significant portion of the liquid residue required to maintain stable operation of the thickening unit. This will become apparent in the examples. The pure crystals and the remaining liquid residue are then transported to the purification stage. The liquid residue removed from the slurry, now sufficiently depleted in product, can be discharged from the system.

The operating temperate of the recovery step can be significantly lower than that found in the purification step and depends on the recovery requirements for a specific application. At a given crystallization rate the temperature of the recovery step can be directly adjusted by the amount of discharged residue. Against that the final operating temperature of the purity step cannot be controlled directly; it depends on the amount of crystal produced in this step relative to the amount produced in the recovery stage and on the thickening efficiency in the recovery stage. The higher the concentration of pure crystals being recycled back to the purity stage, the less impurities are fed to this stage and the higher the final resulting temperature in this stage. If high concentration differences have to be overcome between the liquid residue from the recovery stage and the pure product, thickening rates of 85% until 95% are required to limit the temperature jump over the purity wash column to allowable values. The maximum allowable temperature jump depends on the specific application and is usually in the range between 10 and 20 K.

The usually high recovery demands would require a crystallization system to run at or close to the eutectic composition. With the present invention only the recovery crystallizer has to run at the low concentrations, whereas the majority of crystals can be grown at more favorable conditions at higher concentrations.

The process of the invention is suitable for the purification of organic materials such as p-Xylene, m-Xylene, p-Dichlorobenzene, p-Nitrochlorobenzene, Acrylic acid, acetic acid, naphthalene, TDI, MDI, Caprolactam, MCAA, phenol, bisphenol A, lactic acid and the like and is also suitable for concentration by crystallization e.g. liquid foods, waste waters and other aqueous solutions.

The wash columns described in U.S. Pat. Nos. 3,872,009 and 4,481,169 are used advantageously in this application but are not required to obtain at least some of the benefits of the process. The advantages of wash columns similar applications are explained in U.S. Pat. No. 5,062,862 and wash column use is therefore recommended. It was found that this wash column was especially well suited for the crystal separation in the recovery section. Due to the small crystal size (0.025–0.100 mm) generally produced in these low purity conditions centrifuges and the like generally will not provide the same separation efficiency for this type of slurry stream.

BRIEF DESCRIPTION OF THE DRAWINGS

The invention will be explained in detail with reference to the accompanying drawings. In the drawings:

FIG. 3 shows an embodiment of the crystallization apparatus of FIG. 1.

DETAILED DESCRIPTION OF THE INVENTION

Figure 1:
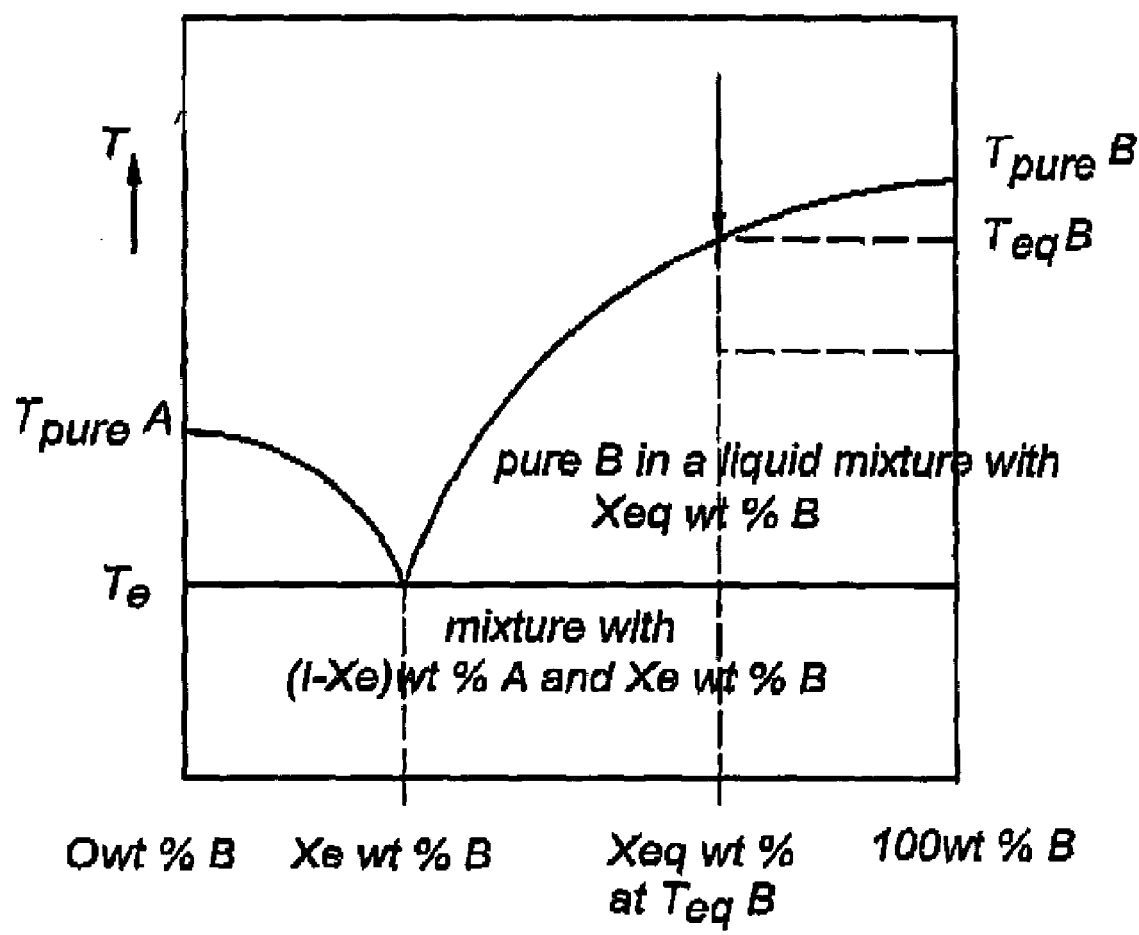
FIG. 1 shows a phase diagram of a mixture of substances A and B,k

FIG. 1 is a phase diagram, giving temperature versus concentration of a mixture of substances A and B. At the equilibrium temperature, $T_{eq}$, pure substance B is in equilibrium in a liquid mixture with $X_{eq}$ weight percent of B. The meta stable region $T_{max}$ is the temperature range below the equilibrium temperature in which no nucleation of crystals occurs.

Figure 2:
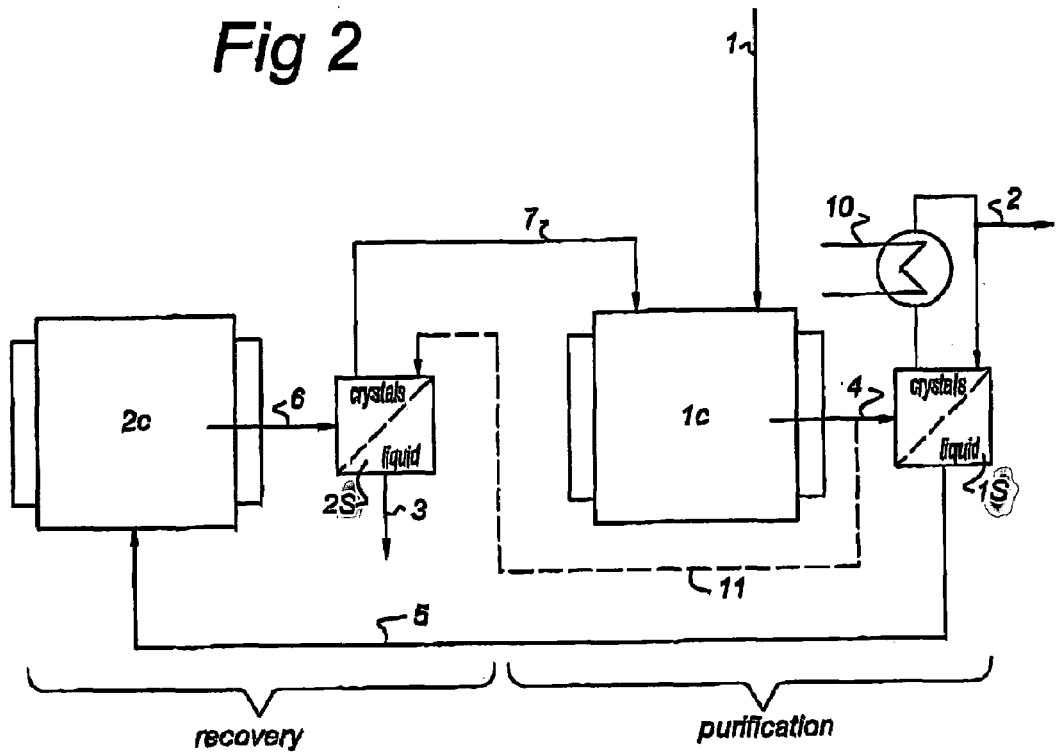
FIG. 2 shows a first embodiment of a crystallization apparatus according to the present invention.

The invention is now described on the basis of the FIG. 2 wherein this figure shows a schematic of the process consisting of essentially identical sections containing a crystallizer and wash column ($1c+1s$ and $2c+2s$). The basic operation of the components is not included since this type of crystallizer is generally known in industry and the specific wash column configuration and operation are described adequately in U.S. Pat. Nos. 3,872,009, 4,787,985 and 5,062,862. There are notable exceptions to this operation that will be included in the following discussion.

The feed stream 1 enters the purification stage crystallizer 1c where it is cooled and part of the product is crystallized forming a slurry stream of pure crystals and the remaining liquid residue. Alternatively, the feed stream 1 can be fed directly into the slurry stream prior to input in the wash column. This will require the addition of a filtration unit within the first crystallizer 1c to produce the liquid residue stream for the second crystallizer. In either feed configuration this slurry is fed via stream 4 to the wash column 1s where the crystals are separated and discharged as pure melted product via stream 2. As mentioned in U.S. Pat. Nos. 4,787,985 and 5,062,862 the minimum slurry temperate is limited by the operation of the wash column. The liquid residue concentration at this minimum temperature is dependent on the physical properties of the product and in most cases is significantly above the actual eutectic concentration. The temperature and thus the liquid residue concentration can be maintained at a level to provide satisfactory operation of the wash column resulting in pure product. The remaining liquid residue still contains valuable product and is recycled via stream 5 to the recovery step crystallizer 2c except in the previously mentioned case where the feed is mixed with the slurry prior to entering the wash column where the liquid residue would be required from a filter in the first crystallizer instead. Part of the stream 5 may be recycled to 1c to maintain a controlled amount of solid crystals in the slurry stream 4 as necessary. The recovery step crystallizer 2c cools the product significantly colder than in 1c. This forms a slurry stream of pure crystals and remaining liquid residue sufficiently depleted in the product to be recovered. The slurry is fed to another wash column 2s via stream 6 where the solid crystals and a minor portion of the liquid residue are transported to the crystallizer 1c. This thickened slurry typically contains 70–90 wt % crynals and can be transported to 1c by various methods, such as indicated in FIG. 2 and FIG. 3. In the embodiment of FIG. 2, the thickened slurry of separator 2s is for instance reslurried by a slurry recycle stream obtained directly from 1c via duct 11. However, duct 11 is optional and can be replaced by equivalent systems of transport.

FIG. 3 illustrates the possibility to use a portion of the feed to reslurry the crystals from the second separator. This liquid stream is necessary since the separator will produce a crystal stream of 60–85% solids and this must be diluted for trasport to the next crystallizer 1c. The same concept is intended when using the filtrate stream from the first separator. No mixing vessel is required since the separator (wash column) is used as the mixer.

The thickened slurry of separator 2s in FIG. 3 can be reslurried by the feed steam 1 via duct 12. A recycle stream from the liquid residue in stream 5 can be fed to separator 2s via duct 13, or even the crystals in stream 7 could be melted and transported as liquid to 1c. Using the feed or a slurry recycle directly from 2c is advantageously chosen as the preferred method for crystal transport, however, the choice to melt the crystals may be required in some cases. The remaining liquid residue is discharged from the process via stream 3. Part of steam 3 may be recycled to 2c to maintain a controlled amount of solid crystals in the slurry stream 6 as necessary. The essential part of this wash column operation is that the crystals do not need to be completely separated as in 1s. The limitations as mentioned in U.S. Pat. No. 5,062,862 to wash column operation do not apply in this mode of operation. The other main difference is that is preferably the major portion of the crystals will be formed in the warmer crystallizer 1c while 2c is utilized mainly as recovery unit. As well known to anyone familiar with crystallization the crystals formed at higher impurity concentrations will generally be significantly smaller than those formed in mixtures with a lower concentration of impurities. The forced sport wash column is particularly well suited to complete this type of separation.

The following example illustrates this process and is compared against the example from U.S. Pat. No. 4,787,985. These figures are not intended to limit the scope of the invention.

EXAMPLE 1

Based on the application of para-xylene as described Example 3 in U.S. Pat. No. 4,787,985 using a feed of 80 wt % para-xylene, a waste stream with a liquid residue concentration of 9.5 wt % para-xylene. Assuming equal crystal production capacity of 900 kg/h in each of four stages the following calculation can be made:

| Stage | PX concentration (wt % PX) | Equilibrium Temperature (° C.) | Temperature change per stage |
|---|---|---|---|
| I | 9.5 wt % | −64° C. | 47 |
| II | 44 wt % | −17° C. | 12 |
| III | 62 wt % | −5° C. | 5 |
| IV | 72 wt % | 0° C. | 7 (wc) |

This can be compared using the same basis and equal crystal production in each stage with the present process as illustrated in FIG. 2.

| Step | PX concentration (wt % PX) | Equilibrium Temperature (° C.) | Temperature change per stage |
|---|---|---|---|
| 1 | 60 wt % | −6° C. | 19 (wc) |
| 2 | 9.5 wt % | −64° C. | 58 |

The temperature change between stages is due to the difference in impurity concentration. The effect of the second wash column between step 2 and step 1 can have a significant influence on the change in concentration. This calculation is based on an efficiency of 80%. This value is typical of the results obtained from a wash column operated in this configuration. The porosity, the amount of space not occupied by crystals, of a packed bed of crystals formed in a forced transport type wash column is typically between 15% and 40%. The separation efficiency of this wash colun based only on compression would then be in the range of 85–60% since the space not occupied by crystals would most likely be filled with liquid residue containing impurities. The compressive forces and partial washing provided by the wash column typically provide efficiencies in the range of 80–90%.

EXAMPLE 2

Based on the application of para-dichlorobenzene and using a feed of 95 wt % para-dichlorobenzene, a waste steam with a liquid residue concentration of 30 wt % para-dichlorobenzene. Assuming equal crystal production capacity of 500 kg/h in each of four stages the following calculation can be made for the four-stage process:

| Stage | pDCB concentration (wt %) | Equilibrium Temperature (° C.) | Temperature change per stage |
|---|---|---|---|
| I | 30 wt % | −1° C. | 23 |
| II | 52 wt % | 22° C. | 12 |
| III | 67 wt % | 34° C. | 14 |
| IV | 77 wt % | 40° C. | 13 (wc) |

This can be compared using the same basis and producing 75% of the crystals in the first step and the remaining 25% crystal production in second step with the present process as illustrated in FIG. 2.

| Step | pDCB concentration (wt %) | Equilibrium Temperature (° C.) | Temperature change per stage |
|---|---|---|---|
| 1 | 77 wt % | 40° C. | 13 (wc) |
| 2 | 30 wt % | −1° C. | 41 |

This example illustrates the power of this two-step process in that the concentration of the product fed to the first separator is equal to that of the four-stage process. Thereby significantly reducing the complexity of the process and reducing the investment costs with the same product purity.

EXAMPLE 3

Using the same conditions as in example 2, the crystal production is shifted where larger portion (90% of the total product) is crystallized in the first step. The temperature of the slurry from the first step is colder than before and therefore the temperature across the wash column is also higher. Controlling the ratio of crystal production between the two stages makes it possible to optimize the wash column performance.

| Step | pDCB concentration (wt %) | Equilibrium Temperature (° C.) | Temperature change per stage |
| --- | --- | --- | --- |
| 1 | 66 wt % | 33° C. | 20 (wc) |
| 2 | 30 wt % | −1° C. | 34 |

What is claimed is:

1. Apparatus for the purification of a substance from a solution, a suspension or a mixture of liquids by crystallization, comprising:
   a. a first crystallizer (1c) comprising an input (1) for receiving a liquid comprising the substance and an output (4) for discharging a slurry of liquid and crystals,
   b. a first separator (1s) connected to the output (4) of the first crystallizer (1c) having a product output (2), and having a residue output (5) connected to an input of a second crystallizer (2c),
   c. a second separator (2s) having an input connected to an output (6) of the second crystallizer (2c) and having a crystal output (7) connected to an input of the first crystallizer (1c),
   wherein crystals separated in the second separator (2s) are combined with a slurry stream (11) from the first crystallizer that bypasses the first separator and the second crystallizer before being input into the first crystallizer (1c).

2. The apparatus according to claim 1, wherein at least one of the separators (1s, 2s) comprises a wash column.

3. The apparatus according to claim 2, wherein the second separator (2s) comprises a piston type wash column.

4. The apparatus according to claim 1, including a filter or a settling zone for the crystals in at least one of the crystallizers.

5. The apparatus according to claim 1, wherein the output of the second separator (2s) comprises a heating means (10).

6. Apparatus for the purification of a substance from a solution, a suspension or a mixture of liquids by crystallization, comprising:
   a. a first crystallizer (1c) comprising an input (1) for receiving a liquid comprising the substance and an output (4) for discharging a slurry of liquid and crystals,
   b. a first separator (1s) connected to the output (4) of the first crystallizer (1c) having a product output (2), and having a residue output (5) connected to an input of a second crystallizer (2c),
   c. a second separator (2s) having an input connected to an output (6) of the second crystallizer (2c) and having a crystal output (7) connected to an input of the first crystallizer (1c),
   wherein crystals separated in the second separator (2s) are combined with part of said residue output (5) via a duct (13) that bypasses the second crystallizer before being input into the first crystallizer (1c).

7. The apparatus according to claim 6, wherein at least one of the separators (1s, 2s) comprises a wash column.

8. The apparatus according to claim 7, wherein the second separator (2s) comprises a piston type wash column.

9. The apparatus according to claim 6, including a filter or a settling zone for the crystals in at least one of the crystallizers.

10. The apparatus according to claim 6, wherein the output of the second separator (2s) comprises a heating means (10).

11. The apparatus according to claim 6, wherein crystals in the second separator (2s) are combined with at least part of the feed (1) via a duct (12) before being input into the first crystallizer (1c).

* * * * *